US006920609B1

United States Patent
Manber et al.

(10) Patent No.: US 6,920,609 B1
(45) Date of Patent: Jul. 19, 2005

(54) SYSTEMS AND METHODS FOR IDENTIFYING AND EXTRACTING DATA FROM HTML PAGES

(75) Inventors: Udi Manber, Palo Alto, CA (US); Qi Lu, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 582 days.

(21) Appl. No.: 09/645,479

(22) Filed: Aug. 24, 2000

(51) Int. Cl.⁷ .......................... G06F 17/00; G06F 17/30
(52) U.S. Cl. .................. 715/513; 715/501.1; 715/503; 707/6; 707/1
(58) Field of Search .................. 715/513, 501.1, 715/503, 514; 707/6, 1, 100, 102

(56) References Cited

U.S. PATENT DOCUMENTS

| 5,875,441 | A | * | 2/1999 | Nakatsuyama | 707/1 |
| 5,956,726 | A | * | 9/1999 | Aoyama et al. | 707/102 |
| 5,983,268 | A | * | 11/1999 | Freivald et al. | 709/218 |
| 6,012,087 | A | * | 1/2000 | Freivald et al. | 709/218 |
| 6,347,320 | B1 | * | 2/2002 | Christensen et al. | 707/102 |
| 6,408,297 | B1 | * | 6/2002 | Ohashi | 707/10 |
| 6,502,112 | B1 | * | 12/2002 | Baisley | 715/513 |
| 6,519,557 | B1 | * | 2/2003 | Emens et al. | 704/8 |
| 6,526,410 | B1 | * | 2/2003 | Aoyama et al. | 707/102 |
| 2004/0249824 | A1 | * | 12/2004 | Brockway et al. | 707/100 |
| 2005/0038785 | A1 | * | 2/2005 | Agrawal et al. | 707/6 |

* cited by examiner

Primary Examiner—Stephen Hong
Assistant Examiner—Adam L. Basehoar
(74) Attorney, Agent, or Firm—Townsend and Townsend and Crew LLP; Gerald T. Gray

(57) ABSTRACT

Systems and methods for analyzing HTML formatted web pages to automatically identify and extract desired information. A computer algorithm identifies and extracts different pieces of information from different web pages automatically after minimal manual setup. The algorithm automatically analyzes pages with different content if they have the same, or similar, formats.

27 Claims, 2 Drawing Sheets

SYSTEMS AND METHODS FOR IDENTIFYING AND EXTRACTING DATA FROM HTML PAGES

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

REFERENCE TO A COMPUTER PROGRAM LISTING APPENDIX

A computer program listing appendix, submitted on a compact disc, includes Appendix A as referred to herein. The computer program listing appendix is hereby incorporated by reference herein.

BACKGROUND OF THE INVENTION

The present invention relates generally to analyzing and extracting information from web pages, and more particularly to automatically identifying and extracting desired information in web pages.

The World Wide Web (WWW) is now the premier outlet to publish information of all types and forms. Documents published on the web, commonly called web pages, are published using a language called HTML (or Hyper Text Markup Language), which sets standards for the formatting of documents. These standards make it possible for people to read and understand documents no matter which program they use for that purpose. For the most part, documents are designed and written to be read by real persons. But there is a growing need to have automatic programs extract certain parts of documents with minimal human intervention. For example, suppose that a document D contains information about product P. D may contain a picture of P, its description, its price, its availability and several characteristics of P. A different document D', published by a different company about the same product P, may have similar parts, but they will most likely be arranged and formatted in a completely different way. People reading D and D' can easily parse the information and understand its different pieces, but it is difficult for a computer program to so do without knowing in advance which pieces are included and how they are arranged. The same company that published the web page for product P may also publish pages on numerous other products. These pages may be similarly formatted, but since they describe different products they contain entirely different information.

As an example, a typical HTML document includes formatting commands or tags, and content which can be text, images, programs, and so on. HTML tags are enclosed in brackets < >. For example, the text "Product P available in California ON SALE for $19.99" can be formatted as:

```
<table>
<tr>
Product P
<img src=p.gif>
<i>available</i>
```

```
in California
<font color=red>
ON SALE
</font>
for $19.99
</tr>
</table>
```

This HTML code puts the line as a row in a table, adds an image, italicizes "available ", and highlights "ON SALE " in red. A typical commerce page may have hundreds of formatting tags.

A different product Q may appear as:

"Product Q in Oregon and Washington for $15.99" and be formatted as:

```
<table>
<tr>
Product Q
<img src=q.gif>
<i>available</i>
in Oregon and Washington for $15.99
</tr>
</table>
```

If one is interested in extracting only the price of the product, a typical rule-based extraction mechanism, using the first document for product P, may infer that the price appears after the ON SALE text, or after the red formatted text. However, this same extraction mechanism, when analyzing the second document for product Q, will miss the price of product Q, because neither the ON SALE text nor the red formatting is present. In general, the page may be much more complex and variable.

Accordingly, it is desirable to provide methods and systems for analyzing the structure of web pages and for automatically extracting pertinent information from the web pages.

SUMMARY OF THE INVENTION

The present invention provides systems and methods for analyzing web pages formatted using HTML or other markup language to automatically identify and extract desired information. In one embodiment, aspects of the invention are embodied in a computer algorithm that identifies and extracts different pieces of information from different web pages automatically after minimal manual setup. The algorithm automatically analyzes pages with different content if they have the same, or similar, formats. The algorithm is robust, in the sense that it operates successfully and correctly in the presence of small changes to the formatting of documents. The algorithm is fast and efficient and performs the extraction process quickly in real-time. Many database and data mining applications require structured data—they have to know the meanings of numbers and text, and not just their values, so they can infer relationships among them. Using the techniques of the present invention, it becomes possible to build databases from unstructured web information. The algorithm can be implemented in an agent that captures information about products, and compares prices or other characteristics. The algorithm can also be used to populate structured databases that, given the different pieces of information, can analyze products and their characteristics. Additionally, the algorithm can be used for data mining applications, e.g., looking for patterns useful for marketing analyses, for testing and quality assurance (QA) purposes, or other uses.

According to an aspect of the invention, a method is provided for identifying and extracting content from HTML formatted web pages. The method typically comprises the steps of selecting a model page, wherein the model page includes a plurality of HTML tags, identifying an area of interest in the model page, and parsing the model page to determine a first string of symbols associated with the plurality of HTML tags, wherein the first area of interest is identified by a first portion of the first string of symbols. The method also typically includes the steps of retrieving a second web page, parsing the second web page to determine a second string of symbols associated with the HTML tags of the second web page, comparing the first and second strings to determine whether the second string includes a second portion similar to the first portion of the first string, wherein the second portion corresponds to a second area of interest in the second page, and thereafter extracting the second area of interest from the second page. In preferred aspects the steps of selecting the model page and identifying a first area of interest are performed manually, and the remaining steps are performed automatically.

According to another aspect of the present invention, a computer readable medium is provided containing instructions for controlling a computer system to automatically identify and extract desired content from a retrieved HTML formatted web page. The medium includes instructions to control the computer system to automatically parse the HTML code of a manually selected model web page to determine a first string of symbols associated with a first plurality of HTML tags. The medium also typically includes instructions to control the computer system to automatically retrieve a second web page, parse the HTML code of the second web page to determine a second string of symbols associated with HTML tags of the second page, compare the first and second strings to determine whether the second page includes a second plurality of HTML tags substantially matching the first plurality of HTML tags, and extract a portion of the second page corresponding to the second plurality of HTML tags.

According to yet another aspect of the present invention, a computer system is provided for identifying and extracting content from HTML formatted web pages. The system typically comprises a means for retrieving web pages including HTML tags, wherein a model web page is retrieved, and a means for manually identifying a first area of interest in the model page, wherein the first area of interest corresponds to a first plurality of HTML tags. The system also typically comprises a processor including a means for parsing a page, wherein the parsing means parses the model page to determine a first string of symbols associated with the first plurality of HTML tags, and wherein the parsing means thereafter parses an automatically retrieved second web page to determine a second string of symbols associated with the HTML tags of the second web page. The processor also typically includes a means for comparing the first and second strings to determine whether the second string includes a second portion similar to the first portion of the first string, wherein the second portion corresponds to a second area of interest in the second page, and a means for extracting the second area of interest from the second page.

According to a further aspect of the invention, a computer implemented method of identifying and extracting content from web pages formatted using a markup language is provided. The method typically includes the steps of selecting a model page, wherein the model page includes a plurality of tokens, identifying a first area of interest in the model page, and parsing the model page to determine a first string of symbols associated with the plurality of tokens, wherein the first area of interest is identified by a first portion of the first string of symbols. The method also typically includes the steps of retrieving a second web page, parsing the second web page to determine a second string of symbols associated with the tokens of the second web page, comparing the first and second strings to determine whether the second string includes a second portion similar to the first portion of the first string, wherein the second portion corresponds to a second area of interest in the second page, and thereafter extracting the second area of interest from the second page. The present invention is applicable to any markup language, including any instance of SGML, such as XML, WML, HTML, DHTML and HDML.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
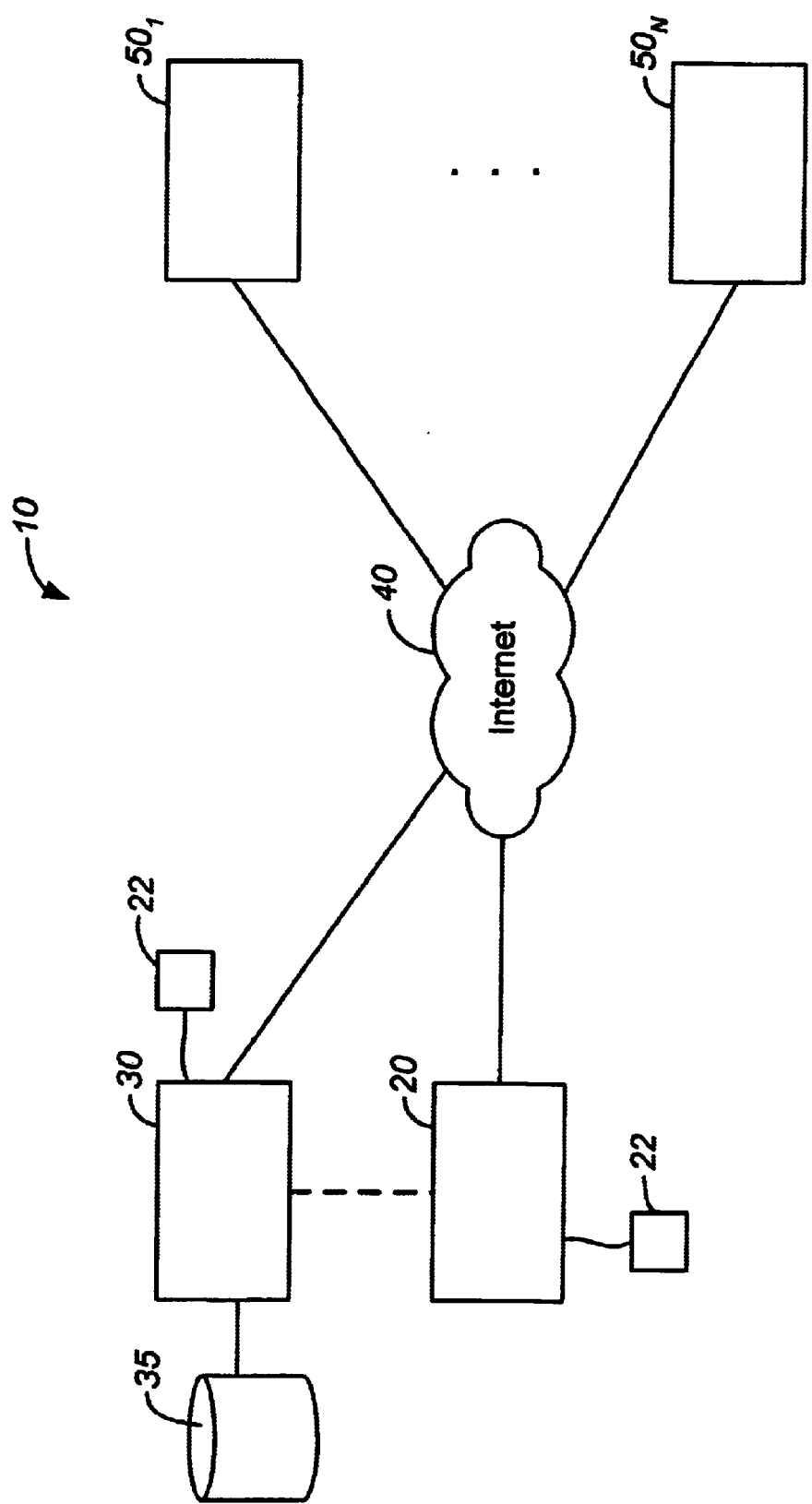
FIG. 1 illustrates a general overview of an information retrieval and communication system according to an embodiment of the present invention.

FIG. 1 illustrates a general overview of an information retrieval and communication network 10 including a client device 20 according to an embodiment of the present invention. In computer network 10, client device 20 is coupled through the Internet 40, or other communication network, to servers $50_1$ to $50_N$. Client device 20 is also interconnected to server 30 either directly, over any LAN or WAN connection, or over the Internet 40. As will be described herein, client device 20 is configured according to the present invention to access and retrieve web pages from any of servers $50_1$, to $50_N$, identify and extract desired information therefrom, and provide the information to server 30 to populate database 35. Although as described herein, access and processing of web pages is performed using client device 20, it will be understood that server 30 can also be configured to access and process web pages according to the present invention described herein.

Several elements in the system shown in FIG. 1 are conventional, well-known elements that need not be explained in detail here. For example, client device 20 (and server 30) could be a desktop personal computer, workstation, laptop, PDA, cell phone, or any WAP-enabled device or any other computing device capable of interfacing directly or indirectly to the Internet. Client device 20 typically runs a browsing program, such as Microsoft's Internet Explorer, Netscape Navigator or the like, allowing a user of client 20 to access and browse pages available to it from servers $50_1$ to $50_N$ over Internet 40. Client 20 (and server 30) also typically includes one or more user interface devices 22, such as a keyboard, a mouse, touchscreen, pen or the like, for interacting with a graphical user interface (GUI) provided by the browser in conjunction with pages and forms retrieved from servers $50_1$, to $50_N$ or other servers. The present invention is suitable for use with the Internet, which refers to a specific global Internetwork of networks. However, it should be understood that other networks can be used instead of the Internet, such as an intranet, an extranet, a virtual private network (VPN), a non-TCP/IP based network, or the like.

According to one embodiment, client device 20 or server 30, and all of its components are operator configurable using an application including computer code run using a central processing unit such as an Intel Pentium processor or the like. Computer code for operating and configuring client device 20 or server 30 as described herein is preferably stored on a hard disk, but the entire program code, or portions thereof, may also be stored in any other volatile or non-volatile memory medium or device as is well known, such as a ROM or RAM, or provided on any media capable of storing program code, such as a compact disk medium, DVD, a floppy disk, or the like. Additionally, the entire program code, or portions thereof may be downloaded from a software source to client device 20 or server 30 over the Internet as is well known, or transmitted over any other conventional network connection as is well known, e.g., extranet, VPN, LAN, etc., using any communication medium and protocol as are well known. Appendix A includes an example of code for implementing the techniques of the present invention. It will also be appreciated that computer code for implementing the present invention can be implemented in JavaScript, or any scripting language such as VBScript, that can be executed on a client device or server system. Although it is understood that server 30, or any other server, can be configured using the code as above, the following will discuss the present invention implemented in the context of client device 20.

In general, a user is able to access and query servers $50_1$ to $50_N$ and other servers through client device 20 to view and download content such as news stories, advertising content, search query results including links to various websites and so on. Such content can also include other media objects such as video and audio clips, URL links, graphic and text objects such as icons and hyperlinks, and the like. As described herein, the techniques of the present invention are particularly useful for identifying and extracting information related to products from remote vendor servers. Such information can be used, for example, to populate database 35 with comparative information for access by subscribers or the general public, e.g., over the Internet. For example, the extracted information can be used to populate database 35 with comparative pricing information for a particular product or service or related products or services. One example of such an accessible server/database for which the invention is useful is the Yahoo! Shopping website. It will of course be apparent that the present invention is useful for identifying and extracting any desired information in web pages retrieved from any website for use in any data mining application or other application.

Figure 2:
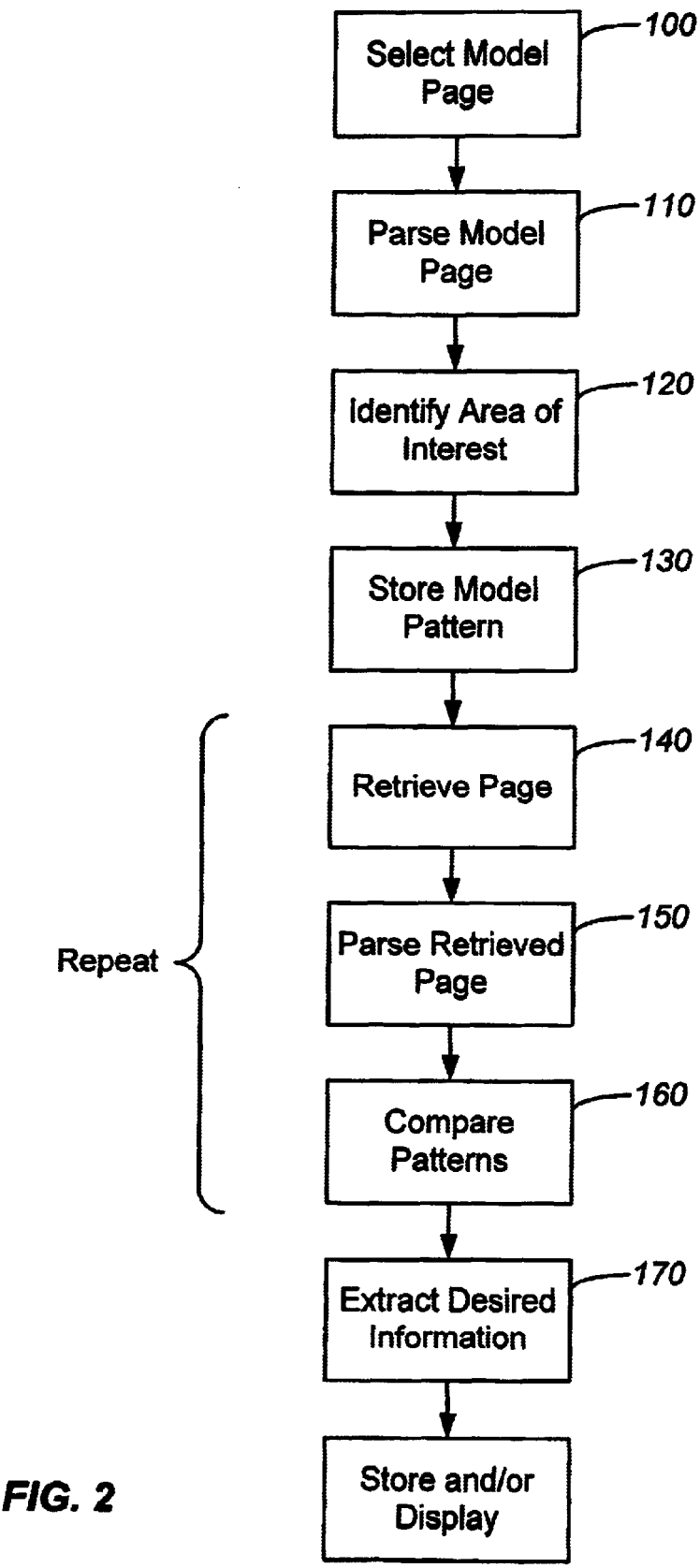
FIG. 2 is a flow chart showing the process of identifying and extracting information from web pages according to an embodiment of the present invention.

FIG. 2 is a flow chart showing the process of identifying and extracting information from web pages according to an embodiment of the present invention. In the following description, it is assumed that the web pages are formatted using HTML, although the present invention is equally applicable to processing web pages formatted using any markup language including any instance of the Standard Generalized Markup Language (SGML), such as XML, WML, HDML (for hand-held devices), DHTML and others.

According to one embodiment, at step 100 an operator using client device 20 (or server 30) first selects a target page that is deemed a model page for a particular product type, company format, or any other type of document. For example, the operator accesses a particular product page for product P from one of servers $50_1$ to $50_N$, which corresponds to a particular remote vendor's website. At step 110, the HTML code for the selected page is parsed to determine a model pattern for the page. In one embodiment, a model pattern based on the selected page is built by first dividing the web page into HTML tokens. In general, HTML tokens include tag elements and text elements. In one embodiment, the text is preferably initially ignored, and the tags that are primarily used for formatting purposes, e.g., <form>, rather than being a major part of the design of pages, are also preferably ignored (which tokens to ignore is an option set by the operator in one embodiment). The remainder is typically a sequence of start tags and closing tags. Each of the tokens is preferably translated into a unique number, represented for illustration purposes as a character. For example, the format for product P above can be represented as a sequence TRGIF/FIR/T, where T represents <table>, /T represents </table>(end table), R represents <tr>, and so on. In this representation scheme, the HTML code for product Q would be represented as a sequence TRGI/R/T.

In general HTML includes the name of the tag, e.g., <table>, and also several possible attributes, e.g., <font color=red>. In preferred aspects, the present invention is configured to parse the HTML document using the tags and the attributes as will be discussed below in more detail.

At step 120, the operator identifies an area of interest in the selected page. In one embodiment, a graphical user interface (GUI) is provided to the operator as part of a manual selection and extraction tool. The operator is able to select or highlight portions of the page that are of interest, e.g., the price of product P and/or the red-formatted ON SALE text. The operator preferably selects portions of the page (e.g., portions of the displayed web page or portions of the corresponding HTML code) using interface device 22, such as a mouse or keyboard or other manual pointing and selecting device. The operator can select to ignore parts of the pattern sequence. For example, the beginning of the document may include text not directly related to the desired information (e.g., ads). The operator can choose to ignore this information, for example, by not selecting this portion with the selection tool. That which is selected (i.e., not ignored) is stored as the model pattern sequence at step 130. It will be apparent that steps 110 and 120 are interchangeable in that the operator can first select the desired area in the selected page and thereafter the application will parse the HTML code corresponding to the selected area of the page. At step 130, the model pattern is stored in a memory for comparison with patterns representing portions of other pages.

At step 140, another page (e.g., related document) is retrieved from the same vendor site or from a different site. Client 20 is preferably configured to automatically retrieve a subsequent page for analysis from a website using the site's URL. For example, client 20 may be configured to retrieve a subsequent page from the same site from which the target page was retrieved, or from a list of one or more universal resource locators (URLs), either randomly or in a specific order. This subsequent page is then parsed to produce a pattern sequence for comparison with the stored pattern of the target page to identify related information. In particular, at step 150, the HTML code of this subsequent document is parsed as in step 110. At step 160, the stored model pattern sequence is compared against the pattern sequence obtained from the subsequent document to identify matching or similar pattern segment(s). The two pattern sequences may not match exactly. According to one embodiment, an approximate string matching technique is used to solve this problem. Because the HTML code from both pages have been translated into sequences of characters (e.g., numbers) in steps 110 and 150, it is possible to employ an approximate pattern matching technique to match with high confidence the parts of the patterns that correspond to the same type of information. Because HTML tokens can include attributes, it may not be sufficient to simply treat tokens as a character in the analysis. For example, the tags <table width=50> and<table width=100> represent two entirely different tables and should not be treated as the same. Therefore, according to one embodiment of the present invention, the approximate string matching algorithm is extended to include comparisons of the attribute values. In the above example, comparisons of the attribute values for the table width tags are compared to determine whether a match exists. An example of an approximate string matching algorithm for use with the present invention is included in Appendix A. At step 170, the results of the comparison are used to extract the desired information from the subsequent page to be stored (e.g., in database 35) and/or displayed. Any number of subsequent pages may be retrieved and analyzed with respect to the stored pattern of the target page by repeating steps 140 to 170.

According to another embodiment of the present invention, web pages are analyzed in a streaming fashion. There is no need to wait until the whole page is fetched for analysis. Whenever a part of the page is received it is analyzed immediately; that part of the page is parsed and compared with the stored pattern in real-time. If a matching pattern is found, the rest of the page can be discarded. Because the delays associated with retrieving pages are usually more time consuming than the delays associated with executing the application program, a streaming approach speeds the process considerably.

Some web pages may have several alternative formats which are quite different and cannot be inferred from one to another. For example, results of a search for a particular author may return a list of authors matching the name, or a list of books by the uniquely named author. According to one embodiment of the present invention, several patterns are analyzed in parallel. In this embodiment, all the model patterns that correspond to formats associated with a single site are compared, approximately, to the incoming page from that site. The first model pattern that leads to a good match is used, and the rest of the patterns may be ignored from then on.

Often a single page contains information about several products. A pattern used in this case can include several sub-patterns, each with a different use. One sub-pattern may identify the beginning of the list of items. Another may identify a pattern to ignore in the middle of the page. Yet another may identify a repeated item, for example, a list of books from the same authors, each with a description and a price. Accordingly it is understood that the general approximate matching techniques as described herein enable the matching of different patterns for different purposes, all within the same framework.

To add to the reliability of the result, standard regular expression matching techniques are also applied to the extracted information in one embodiment. For example, when looking for a price, the result should contain a dollar sign (or other currency signs) and should be of a form that corresponds to a price. Such techniques are preferably used to help resolve cases where more then one piece matches the desired extracted information.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of identifying desired content in HTML formatted web pages, comprising the steps of:

selecting a model page, wherein the model page includes content data and a plurality of HTML tags for formatting the content data;

identifying a first area of interest in the model page;

parsing the model page to generate a first string of symbols for the plurality of HTML tags, the generated symbols in the first string representing only HTML tags, wherein the first area of interest is identified by a first portion of the first string of symbols;

retrieving a second web page associated with a different URL than the model page;

parsing the second web page to generate a second string of symbols for a plurality of HTML tags of the second web page, the generated symbols in the second string representing only HTML tags; and comparing the first and second symbol strings to determine whether the second string includes a second portion similar to the first portion of the first string, wherein the second portion corresponds to a second area of interest in the second page.

2. The method of claim 1, wherein the step of comparing includes applying an approximate pattern matching algorithm to the first and second strings.

3. The method of claim 1, further comprising the step of storing the first and second areas of interest in a database.

4. The method of claim 1, further comprising the step of extracting content data in the second area of interest from the second page.

5. The method of claim 4, further comprising the step of applying a regular expression matching algorithm to the extracted second area of interest.

6. The method of claim 1, wherein the first and second areas of interest each include two or more distinct sub-areas of the respective page.

7. The method of claim 1, wherein the step of identifying a first area of interest includes the step of identifying portions of the HTML tags of the model page.

8. The method of claim 1, wherein the step of identifying a first area of interest is performed using a manual pointing and selecting device.

9. The method of claim 1, wherein the steps of selecting and identifying are performed manually and wherein the remaining steps are performed automatically.

10. The method of claim 1, wherein the second web page is retrieved from a remote website over the Internet.

11. The method of claim 1, wherein the HTML tags include attributes and attribute values.

12. A computer readable medium containing instructions for controlling a computer system to automatically identify desired content in a retrieved HTML formatted web page, by automatically:

parsing the HTML code of a manually selected model web page to generate a first string of symbols for a first plurality of HTML tags, the generated symbols in the first string representing only HTML tags;

retrieving a second web page associated with a different URL than the model web page;

parsing the HTML code of the second web page to generate a second string of symbols for HTML tags of the second page, the generated symbols in the second string representing only HTML tags; and comparing the first and second symbol strings to determine whether the second page includes a second plurality of HTML tags substantially matching the first plurality of HTML tags.

13. The computer readable medium of claim 12, wherein the first plurality of HTML tags are identified by an operator using a pointing and selection device coupled to the computer system.

14. The computer readable medium of claim 12, wherein the second web page is retrieved from a remote website over the Internet.

15. The computer readable medium of claim 12, further including instructions for extracting a portion of the second page corresponding to the second plurality of HTML tags.

16. The computer readable medium of claim 15, wherein the instructions further control the computer system to store the extracted portion of the second page in a database.

17. The computer readable medium of claim 15, further including instructions for controlling the computer system to apply a regular expression matching algorithm to the extracted portion of the second page.

18. The computer readable medium of claim 15, wherein the extracted portion of the second page includes two or more distinct sub-areas.

19. The computer readable medium of claim 12, wherein the instructions for comparing include instructions for applying an approximate string matching algorithm to the first and second strings.

20. The computer readable medium of claim 12, wherein the HTML tags include attributes and attribute values.

21. A computer system for identifying and extracting content from HTML formatted web pages, the system comprising:

means for retrieving web pages including content data and HTML tags for formatting the content data, wherein a model web page is retrieved;

means for manually identifying a first area of interest in the model page, wherein the first area of interest corresponds to a first plurality of HTML tags; and a processor including:

means for parsing a page, wherein the parsing means parses the model page and generates a first string of symbols for the first plurality of HTML tags, the generated symbols in the first string representing only HTML tags, and wherein the parsing means thereafter parses an automatically retrieved second web page associated with a different URL than the model page and generates a second string of symbols for HTML tags of the second web page, the generated symbols in the second string representing only HTML tags;

means for comparing the first and second symbol strings to determine whether the second string includes a second portion similar to the first portion of the first string, wherein the second portion corresponds to a second area of interest in the second page; and means for extracting content data in the second area of interest from the second page.

22. A computer implemented method of identifying desired content in web pages formatted using a markup language, comprising the steps of:

selecting a model page, wherein the model page includes a plurality of tokens, wherein tokens include HTML tag elements and content elements;

identifying a first area of interest in the model page;

parsing the model page to generate a first string of symbols for the plurality of tokens in the model page, the generated symbols in the first string representing only tag elements, wherein the first area of interest is identified by a first portion of the first string of symbols;

retrieving a second web page associated with a different URL than the model page;

parsing the second web page to generate a second string of symbols for a plurality of tokens of the second web page, the generated symbols in the second string representing only tag elements; and comparing the first and second symbol strings to determine whether the second string includes a second portion similar to the first portion of the first string, wherein the second portion corresponds to a second area of interest in the second page.

23. The method of claim 22, further comprising the step of extracting content elements in the second area of interest from the second page.

24. The method of claim 22, wherein the markup language is selected from the group consisting of HTML, XML, WML, DHTML and HDML.

25. A computer-implemented method of identifying similar content in HTML formatted web pages, the method comprising:

selecting a model page, wherein the model page includes content data and a plurality of HTML tags for formatting the content data;

identifying a first area of interest in the model page;

generating a first string of symbols for the plurality of HTML tags associated with the first area of interest, the generated symbols in the first string representing only HTML tags;

retrieving a second web page associated with a different URL than the model page;

generating a second string of symbols for the HTML tags of the second web page, the generated symbols in the second string representing only HTML tags; and comparing the first and second symbol strings to determine whether the second string includes a portion similar to the first string, wherein the portion corresponds to a second area of interest in the second page.

26. The method of claim 25, further comprising extracting content data in the second area of interest from the second page.

27. The method of claim 25, wherein identifying is performed manually using a user-input device.

* * * * *